Sept. 3, 1929.           H. BARNARD                1,726,796

REENFORCED FRICTION MEMBER FOR DRAFT GEARS

Filed April 28, 1927

Inventor
Harry Barnard

Patented Sept. 3, 1929.

1,726,796

UNITED STATES PATENT OFFICE.

HARRY BARNARD, OF CHICAGO, ILLINOIS, ASSIGNOR TO UNION DRAFT GEAR CO., OF CHICAGO, ILLINOIS, A CORPORATION OF DELAWARE.

REENFORCED FRICTION MEMBER FOR DRAFT GEARS.

Application filed April 28, 1927. Serial No. 187,165.

This invention relates to draft gears, and more particularly to means for reenforcing the wedges employed therein.

The principal object of the invention is the provision of a new and improved friction member for draft gears.

Another object of the invention is the provision of a friction member for a draft gear that is provided with new and improved means for strengthening and reenforcing the same.

A further object of the invention is the provision of a new and improved strengthened and reenforced friction member that is cheap to manufacture, easily cast, strong, durable, efficient in use, and that is not likely to become fractured, distorted or broken.

Other and further objects and advantages of the invention will appear from the following description taken in connection with the accompanying drawings, in which Fig. 1 is a horizontal section of a portion of a draft gear showing the invention in position therein;

Figure 1:
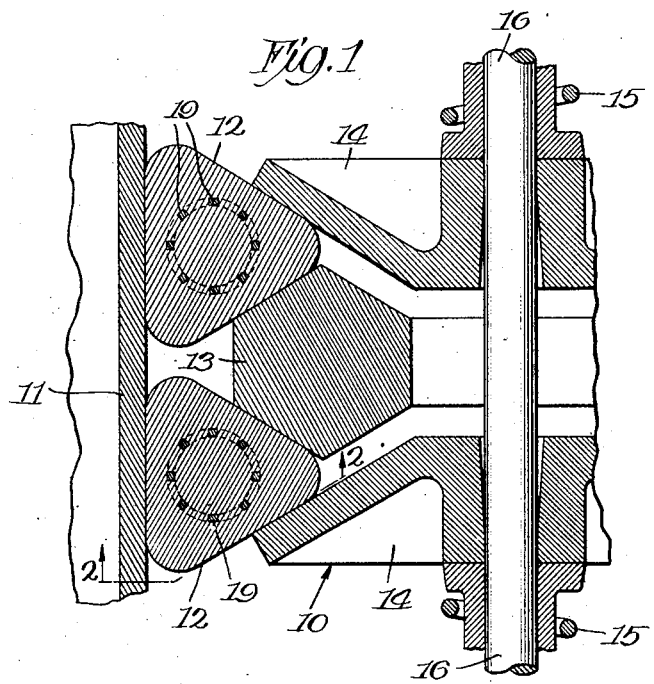

On the drawings the reference character 10 designates generally a draft gear of well known construction. This gear comprises a follower 11 and a pair of wedge blocks or friction members 12 in engagement with said follower. Each of these members is elongated and is substantially triangular in cross-section.

The friction members 12 are in frictional engagement on their inner frictional faces with the central wedge or friction member 13 and on their outer frictional faces with the friction members 14 for forcing the same outwardly against the tension of the springs 15 which are mounted on the rod 16 extending transversely through the members 13 and 14. Since the arrangement of the parts constitutes no part of the present invention, it is not thought necessary to further illustrate or describe the gear or the arrangement of its parts.

Figure 2:
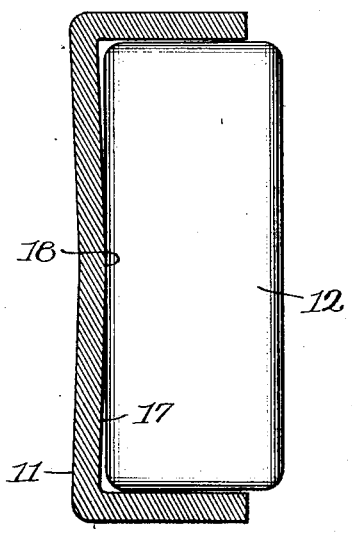
Fig. 2 is a section on line 2—2 of Fig. 1.
Figure 3:
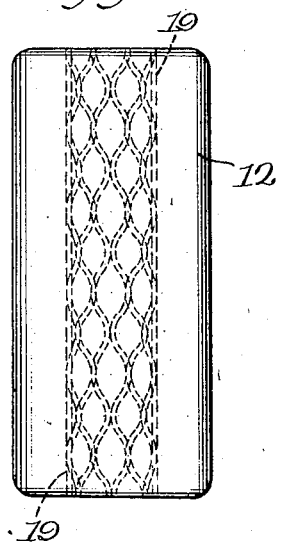
Fig. 3 is an elevation of the reenforced friction member showing the reenforcing member in dotted lines therein.

The wedge or friction members of draft gears are often broken or fractured by the tremendous forces to which they are subjected. In actual practice the breaks or fractures in the wedges are usually transversely to the wedge member where the wedge faces extend in planes parallel with the longitudinal axis of the wedge member. The reason for the breaking of the wedge is probably due to the fact that the wedge engaging face of the follower 11 is more or less uneven due to the warping or uneven shrinking of the metal of the follower when the same is cast. For instance, where the wedge engaging face 17 of the follower 11 is higher at its central portion 18 than at its ends, which it often is, as shown in Fig. 2, there is a tendency in use to break the friction member inasmuch as all parts of the member are forced outwardly, and since its central portion alone has an abutment the ends are placed under stress which causes the member to break transversely at its central portion.

It has been found that by casting a reenforcing metallic member of softer material in the block the resistance to fracture is materially increased.

In the form of the device selected to illustrate one embodiment of the invention a sheet of foraminous material is employed to reenforce the blocks 12. As shown, the reenforcing member 19 is a sheet of so-called expanded metal formed into a cylinder and cast into the block 12. The cylindrical reenforcing member is placed in the mold and the molten metal for the block is poured into the mold all about the reenforcing member. By the use of foraminous material the block is efficiently reenforced, possibly due to the fact that the cast metal flows through the interstices of the reenforcing material so that each individual portion of the foraminous material is interlocked with the cast material, thereby not only firmly anchoring the individual portions of the reenforcing material of the wedge, but also, due to the slight difference in the coefficients of expansion of the two materials, the reenforcing material is placed under a slight strain when the parts cool, which will tend to add materially to the resistance to fracture the wedge. At any rate, it has been found by experiment that the use of expanded sheet metal as a reenforcing member increases the resistance of the wedge to fracture very materially.

The reenforcing member will also hold the parts in position even after they are fractured so that the wedge or friction member will continue to function in the same manner as though no fracture had taken place.

The soft metal reenforcing member may be of any suitable shape, but preferably it is cylindrical because it can be more easily positioned in the mold than if it were triangular for instance. If it were triangular it would be necessary to place the sides of the triangular member parallel with the sides of the mold, but with the cylindrical form this precaution is not necessary. By the use of a cylindrical, triangular or other endless band form of reenforcing member the cast block will be more efficiently reenforced than if a single straight, flat member, for instance, were employed, because with a cylindrical or endless band form there will be a portion of the reenforcing material at the portions of the block opposite each face which will most efficiently resist fracture by the force applied to that face.

I claim as my invention:

1. A wedge member for draft gears comprising an extended body portion triangular in cross-section, a foraminous reenforcing member in said body portion and extending longitudinally thereof, and spaced from each side face of said body portion.

2. A wedge member for draft gears comprising an elongated block member of cast metal wedge shape in cross section and having a cylindrical metallic member embedded in said block member and extending longitudinally thereof, and spaced from each side face of said block member.

3. A friction member for draft gears comprising a metallic block member of cast metal triangular in cross section, a reenforcing soft metal member embedded in said wedge member and symmetrically arranged about the longitudinal axis of said block member.

4. A friction member for use in a draft gear comprising a block of cast metal having an endless metallic band reenforcing member of soft material embedded in said block, for reenforcing the same.

In testimony whereof I affix my signature.

HARRY BARNARD.